(12) United States Patent
Handforth et al.

(10) Patent No.: US 7,366,120 B2
(45) Date of Patent: Apr. 29, 2008

(54) METHOD AND APPARATUS FOR IMPROVING QUALITY OF SERVICE OVER MESHED BACHAUL FACILITIES IN A WIRELESS NETWORK

(75) Inventors: Martin Ridgway Handforth, Kanata (CA); Guy Duxbury, Nepean (CA); Pradsad Kodaypak, Nepean (CA); Herman Kwong, Kanata (CA); Larry Marcanti, Allen, TX (US); Bryan Parlor, Ottawa (CA); Kah-Ming Soh, Kanata (CA)

(73) Assignee: Nortel Networks, Ltd, St. Laurent, Quebec (CA)

( * ) Notice: Subject to any disclaimer, the term of this patent is extended or adjusted under 35 U.S.C. 154(b) by 451 days.

(21) Appl. No.: 10/967,575

(22) Filed: Oct. 18, 2004

(65) Prior Publication Data

US 2006/0083186 A1    Apr. 20, 2006

(51) Int. Cl.
*H04B 7/00* (2006.01)
(52) U.S. Cl. .................. 370/310; 370/335; 370/329; 370/252; 370/407; 455/25; 455/562.1
(58) Field of Classification Search ............ 455/25; 320/310, 335, 329
See application file for complete search history.

(56) References Cited

U.S. PATENT DOCUMENTS

| | | | |
|---|---|---|---|
| 6,701,137 B1 | 3/2004 | Judd et al. | |
| 6,816,706 B1* | 11/2004 | Hohnstein et al. | 455/25 |
| 2002/0159409 A1 | 10/2002 | Wolfe et al. | |
| 2003/0002513 A1 | 1/2003 | Bernheim et al. | |
| 2003/0040335 A1 | 2/2003 | McIntosh et al. | |
| 2003/0040336 A1 | 2/2003 | Waylett et al. | |
| 2004/0114546 A1 | 6/2004 | Seshadri et al. | |

OTHER PUBLICATIONS

T. Rappaport, *Wireless Communications: Past Events and a Future Perspective*, IEEE Communications Magazine, May 2002, pp. 148-161.
*Cellular Backhaul Using Wireless Mesh Topologies*, InterWave White Paper, 2002.
eWeek, *D-Link Wireless Access Point Features Power Over Ethernet*, 2004 (1 page).
International Search Report and Written Opinion dated Jul. 14, 2006 in related PCT application PCT/US2005/036819.
International Preliminary Report on Patentability dated May 3, 2007 in related PCT application PCT/US2005/036819.

* cited by examiner

*Primary Examiner*—David Q. Nguyen
(74) *Attorney, Agent, or Firm*—Anderson Gorecki Manaras LLP

(57) ABSTRACT

Redundant wireless links in a meshed backhaul network may be used to improve quality of service on the backhaul network by confining knowledge of the duality to the attached network elements. Globally, an aggregate bandwidth of the redundant wireless links may be advertised to allow network level routing to treat the redundant links as a single logical link. At the link level, however, the network elements may differentiate between different types of traffic to provide preferential service to particular types of traffic. By using different physical links within the logical link for particular types of traffic, the quality of service for that type of traffic may be improved by not causing different types of traffic to compete for the same bandwidth. The redundant links may be interfaced using a tower network including a radio accessed router optionally powered using solar power, to isolate the tower network from ground equipment.

6 Claims, 8 Drawing Sheets

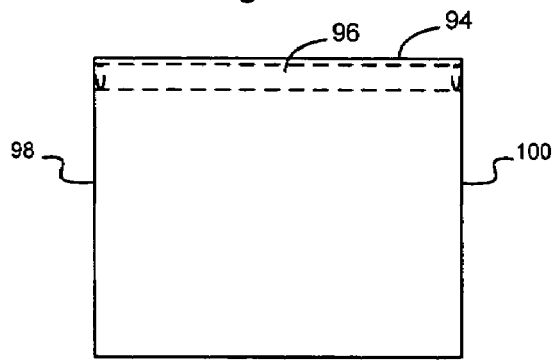
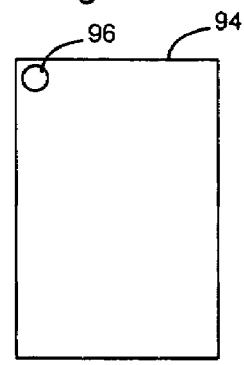
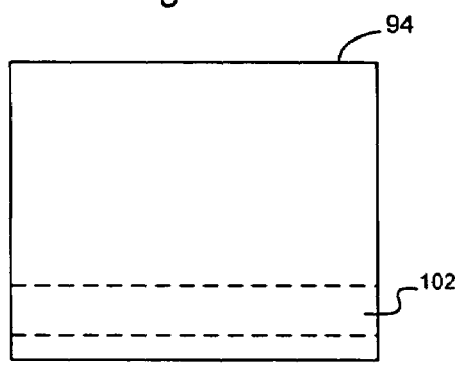
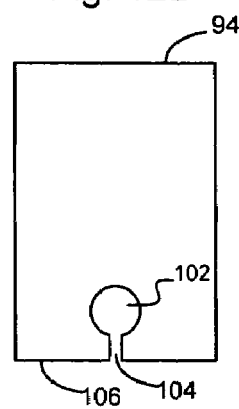
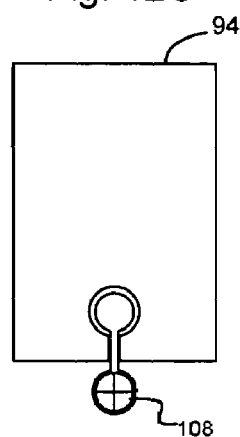
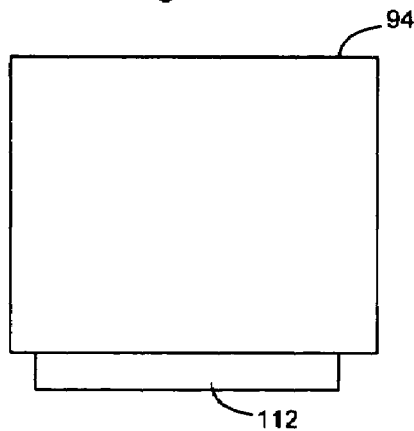
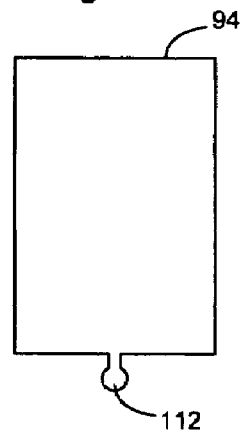
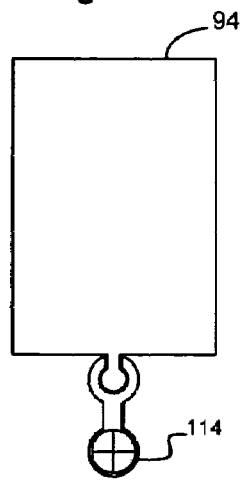

METHOD AND APPARATUS FOR IMPROVING QUALITY OF SERVICE OVER MESHED BACHAUL FACILITIES IN A WIRELESS NETWORK

BACKGROUND OF THE INVENTION

1. Field of the Invention

The invention relates to wireless networks and, more particularly, to a method and apparatus for improving quality of service over meshed backhaul facilities in a wireless network.

2. Description of the Related Art

Data communication networks may include various, hubs, switches, routers, and other network devices, interconnected and configured to handle data as it passes through the network. These devices will be referred to herein as "network elements." Data is communicated through the data communication network by passing protocol data units such as packets, cells, frames, or segments, between the network elements by utilizing one or more communication links. A particular packet may be handled by multiple network elements and cross multiple communication links as it travels between its source and its destination over the network. Links may be formed over physical structures, such as copper cables and optical fibers, or over wireless links formed using transmissions in a portion of the electromagnetic spectrum or infra-red transmissions.

One type of wireless network that has been developed is a cellular wireless communication network. In a cellular network, Base Transceiver Stations (BTSs) issue signals to and collect signals from mobile handsets within a particular range. The signals to be broadcast on the network from the BTS, and the signals received from the handsets, are transmitted to the rest of the network over a backhaul network which may be constructed using wired links or an available wireless technology.

Initially cellular networks were used almost exclusively to carry voice traffic. As the cellular and other wireless networks develop, however, they are increasingly being required to transport data as well as voice traffic. Additionally, some of the data traffic is actually being used to carry voice signals, such as Voice over Internet Protocol (VoIP), which is increasingly becoming ubiquitous. Accordingly, it would be advantageous to provide enhanced quality of service on the backhaul network to enable different types of traffic to be provided with differential priority on the backhaul network.

SUMMARY OF THE INVENTION

Quality of service may be improved in meshed backhaul facilities in a wireless network by providing redundant links between access points in the meshed backhaul network and confining knowledge of the redundant links locally to the access point. The aggregate link capacity of the redundant links may be advertised globally to allow the aggregation of links to be treated as a single link for routing on the network of meshed access points. Locally, however, the access point may differentiate between traffic to cause particular types of traffic or particular classes of traffic to preferentially be transmitted on one or more of the locally distinct links. In this manner, VoIP traffic, data traffic, voice traffic, or other traffic may be preferentially transmitted through the meshed backhaul network to improve the overall quality of service on the backhaul network.

The meshed backhaul facilities in the wireless network may be formed from multiple technologies such as wireless, DSL, optical, T1, and may form a backhaul network for a cellular or other wireless network. By using a mesh topology, with a diversity of paths from the BTSs to fixed access points allows less than carrier grade technologies, such as Ethernet, to be used on the backhaul without sacrificing reliability. Additionally, by distributing backhaul traffic from a given BTS to several fixed access points, it is possible to achieve a closer peak to mean ratio of traffic on the backhaul links to more fully use the available bandwidth on fixed connections between the wireless network and fixed network. By forming the backhaul interface to be able to interface with the existing installed base of BTSs, existing networks may be retrofitted to connect to new backhaul technologies.

According to an embodiment of the invention, the backhaul access points may be formed from multiple radio antenna units interconnected by a network formed on top of a cellular tower and powered by solar panels, fuel cells, power over Ethernet, or an electrical feed. Optionally, data may be communicated to the backhaul access points via one or more wireless links intended to communicate backhaul data vertically up the tower to the backhaul access points.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labelled in every figure. In the figures:

FIGS. 11A-11B, 12A-12C, and 13A-13C illustrate several embodiments of casings for use with the radio antenna unit of FIG. 10.

DETAILED DESCRIPTION

The following detailed description sets forth numerous specific details to provide a thorough understanding of the invention. However, those skilled in the art will appreciate that the invention may be practiced without these specific details. In other instances, well-known methods, procedures, components, protocols, algorithms, and circuits have not been described in detail so as not to obscure the invention.

Figure 1:
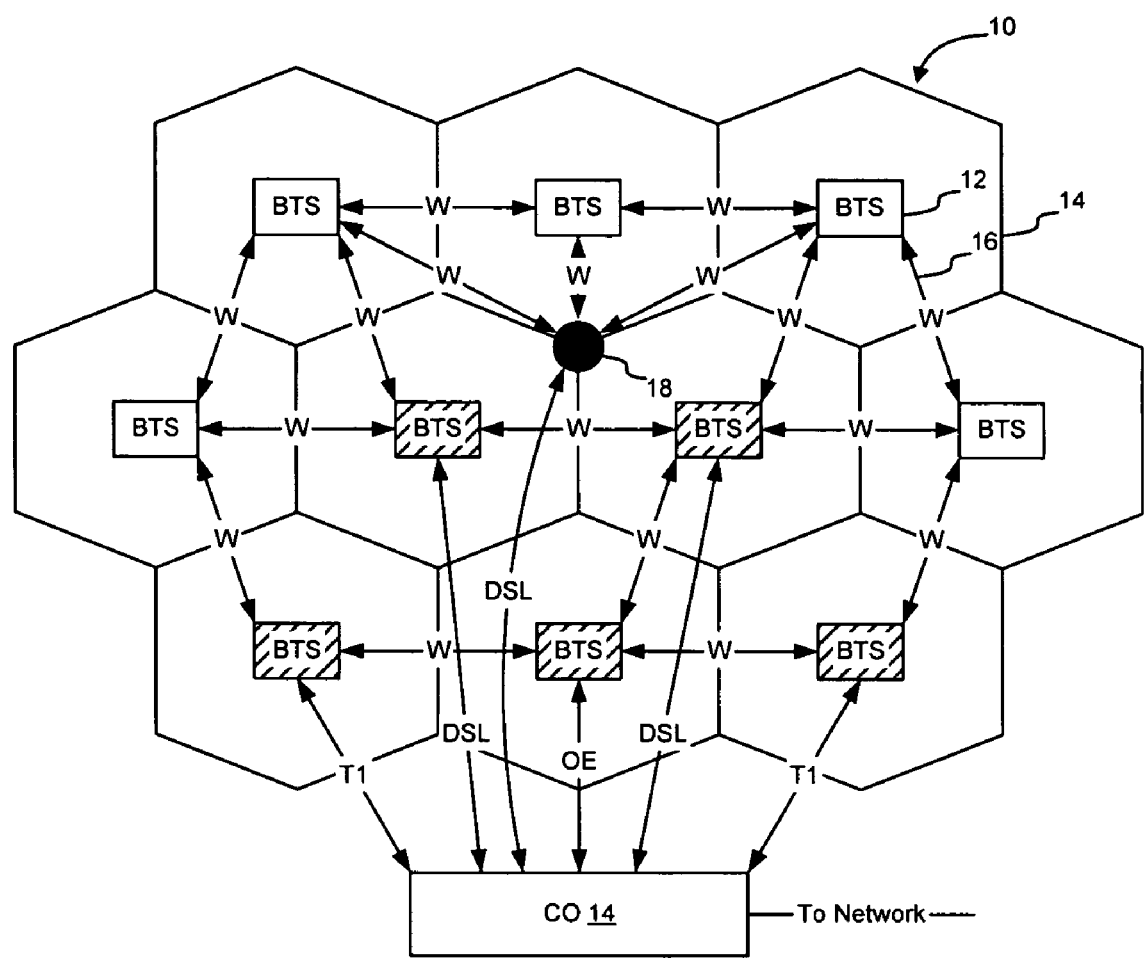
FIG. 1 is a functional block diagram of an example wireless cellular network according to an embodiment of the invention.

An example of a wireless network is shown in FIG. 1. The wireless network may be a cellular wireless network configured to enable communications using one of the cellular protocols or may be a wireless network configured to operate using another wireless protocol such as one of the IEEE 802.11x protocols. The invention is not limited to a particular type of wireless protocol to be used to communicate between base transceiver stations and user equipment on the wireless network.

As shown in FIG. 1, a wireless network 10, includes a plurality of Base Transceiver Stations (BTSs) 12 linked together via wireless backhaul links. The BTSs are connected in a mesh network topography such that backhaul traffic for a BTS may pass through multiple paths through one or more BTSs before reaching a BTS with fixed access to a central office 14 or other aggregation point. In FIG. 1, BTSs with direct access to an aggregation point are shaded. Since these BTSs are part of a meshed backhaul network, traffic from these BTSs may pass directly to the aggregation point or may be handled by other BTSs on its way to the aggregation point.

The links on the backhaul network, such as links between BTSs and links between a BTS and the aggregation point, may be implemented using traditional T1 or T3 telephone lines, one of the Digital Subscriber Line (xDSL) technologies, an optical networking technology, such as gigabit optical Ethernet, or a wireless protocol. xDSL technology enables higher frequency signals to be transported over standard twisted copper pair subscriber loop wires as is well known in the art. There are many different types of xDSL technology, such as symmetric (same bandwidth in each direction) or asymmetric (different downstream and upstream bandwidth). Optionally, Symmetric High bandwidth DSL (SHDSL) may be used to implement a portion of the links on the backhaul network, although the invention is not limited to this embodiment.

The wireless backhaul network may be organized in a mesh topography such that the BTSs on the network may be connected to the aggregation point over multiple diverse paths through the network. Diversity of paths through the network increases redundancy of the network to enable problems such as congestion and network outages to be avoided while also allowing different types of technology (such as Ethernet) to be used on the backhaul. Additionally, the mesh network enables traffic from one BTS to be transported two or more ways on the backhaul to enable traffic from that BTS to be distributed more evenly on the network.

Optionally, the mesh topology network forming the backhaul network may be designed to be a one hop wireless mesh network such that any BTS need only proceed one hop on the wireless mesh backhaul before reaching a BTS with access to the fixed access portion of the backhaul network. This enables the signals from the BTSs to have rapid (without an excessive number of hops) route to fixed network access while reducing the number of fixed access points on the network. In the event of a failure on the one-hop route through the meshed network, a multi-hop route through the meshed backhaul network may be used to connect the BTS to fixed network access. The invention is not limited to this embodiment, however, as other solutions may be used as well, such as enabling two or more hops on the wireless mesh before reaching a BTS with fixed access.

In wireless networks having a one hop meshed backhaul network, the signals from a given BTS may go to multiple BTSs with fixed access before being passed onto the fixed network access. Similarly, signals destined for a BTS with fixed access may be passed over one or more wireless backhaul links to one or more other BTSs with fixed access when there is a problem with transmission over the fixed access from the first BTS, such as congestion or a network outage. Transmissions may be routed through the backhaul network based on flow or other logical separation, and may use any a conventional or proprietary routing algorithm.

Optionally, as shown in FIG. 1, one or more wireless backhaul access nodes 18 may be deployed in the network to aggregate wireless backhaul signals from multiple BTSs and forward the signals to a central office or other aggregation point. The wireless backhaul access nodes may be deployed in the network to reduce the amount of backhaul traffic flowing between BTSs, to alleviate congestion on the network, or otherwise to supplement the backhaul capabilities of the network. Implementation of wireless backhaul access nodes also provides a dedicated network element in the cellular network designed to provide backhaul facilities. This enables a clear demarcation to be drawn between the backhaul wireless transmission network and the cellular network, to enable new carrier networks to be deployed within the cellular network to handle backhaul traffic on the network.

Figure 2:
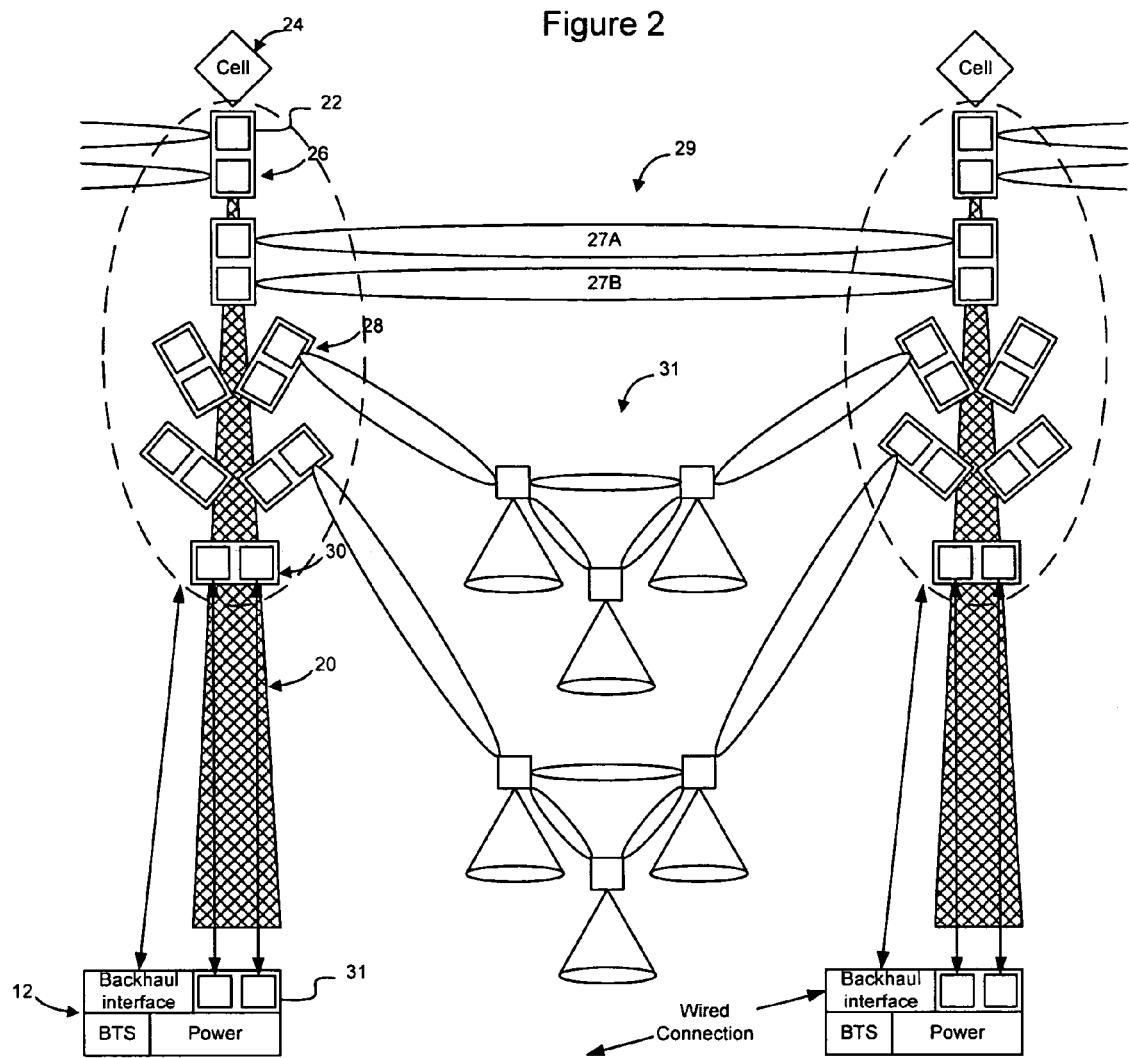
FIG. 2 is a functional block diagram of several Base Transceiver Stations (BTSs) for use in the network of FIG. 1.

The invention is not limited to any particular network topography, and is not to be construed as limited to the topography illustrated in FIG. 2. In the embodiment of FIG. 2, only one network has been illustrated. In practice, multiple tiers of wireless networking may be deployed simultaneously to enable wireless communications to take place with subscribers using multiple wireless technologies. The backhaul network, according to an embodiment of the invention may handle traffic for all or a subset of the multiple deployed wireless subscriber networks.

According to an embodiment of the invention, two or more links are created between adjacent BTSs, which are known only to the adjacent BTSs and not advertised on the network. By having independent links treated separately by the local BTSs but as a single unified link by other network elements, enhanced quality of service may be provided on the meshed backhaul network. For example, as shown in FIG. 1, the wireless links (W) in the meshed backhaul network may be dual redundant parallel links, separated by code, frequency, or in another manner, to form multiple parallel wireless channels between points on the network. These parallel links may be configured to transmit information using the same protocol but in different frequency bands or using different coding schemes to allow the simultaneous transmission of multiple signals between points on the network. According to an embodiment of the invention, knowledge of the redundant link structure may be confined to the endpoints on the link, with the rest of the network treating the multiple redundant links as a single, logical, link. The aggregation of multiple wireless channels between a pair of points, and manners of using the links, will be described in greater detail below.

FIG. 2 illustrates a functional block diagram of several Base Transceiver Stations (BTSs) 12 for use in the network of FIG. 1. As shown in FIG. 2, it is customary for a cellular tower 20 to be provided in connection with a BTS to allow antennas associated with the BTS to be placed high above the surface of the ground. Several conventional wireless communication technologies require line-of-sight transmissions, which means that user equipment must have a line-of-sight path to the BTS antenna(s). By placing the antennas high above the ground, greater line-of-site coverage may be obtained from a given BTS placement to thereby increase the number of users that may be served by a given BTS.

In the example of FIG. 2, the towers 20 are illustrated as carrying three types of antennas—cellular antennas 24; backhaul antennas 26; and subscriber network wireless antennas 28. Additionally, a downward looking antenna 30 may be provided to communicate between the BTS or other ground facilities and the antennas on the tower 20. The cellular antennas may be configured to operate using one of the wireless cellular technologies, such as Universal Mobile Telecommunication System (UMTS), GSM, or one of the numerous other cellular technologies. The invention is not limited to the particular type of cellular technology used to form the cellular network. The cellular network may be configured to communicate with user equipment, such as handsets, computers, PDAs, and other conventional equipment.

The wireless links 27A, 27B on the meshed wireless backhaul network 29 may be formed using a cellular technology such as UMTS or GSM, or may be formed using one of the protocols defined for use in the unlicensed spectrum. Several examples of technologies that may be used to implement the links that are configured to transmit in the unlicensed spectrum include the Institute of Electrical and Electronics Engineers (IEEE) 802.16x protocols, and the EEE 802.11a wireless communication protocol which enables communications to take place at 54 Mbps at a frequency of 5 GHz. The invention is not limited in this manner, however, as other emerging or proposed standards, such as IEEE 802.11n, may be used as well.

One or more additional wireless subscriber networks 31 may be deployed in the same area as the cellular network, and traffic from these networks may be handled by the backhaul network 29 as well. For example, a wireless data network may be deployed and configured to communicate, for example, using the 802.11b wireless communication protocol (or one of the other 802.11x protocols). The 802.11b protocol currently enables communications to take place at 11 Mega bits per second (Mbps) at a frequency of 2.4 GigaHertz (GHz). Other protocols transmitting at other frequencies may be utilized as well and the invention is not limited to this particular example. For example, the subscriber network may be formed using the 802.11g standard, which is being developed to support both 802.11a and 802.11b, or another protocol such as HiperLAN. Allowing both or multiple networks to use the same backhaul facilities reduces the need to provide separate backhaul facilities when new networks using new technologies are deployed. Optionally, the wireless subscriber network 31 may be formed in a mesh topology as well, although the invention is not limited in this manner.

There are several different antenna technologies that may be used to separate transmission of signals or improve special spectral efficiencies and robustness or other characteristics in the several networks. For example, in one embodiment, omni-directional antennas may be used in the lower level mesh network, for example in the subscriber wireless network, and directional antennas may be used in the backhaul wireless network. Other embodiments exist and the invention is not limited to this particular example.

As shown in FIG. 2, the wireless links in the backhaul may be configured to be dual-redundant links formed using separate antenna elements to cause multiple wireless links to be formed between sites in the network. For example, in FIG. 2, dual backhaul links 27A, 27B are formed between the cellular towers 20. These dual links may be used, as described in greater detail below, to increase throughput while increasing redundancy and quality of service in the backhaul network. According to an embodiment of the invention, knowledge of the duality of the links or the degree of redundancy of the links is known to the network elements implementing the links and not advertised to the rest of the network. In this manner local knowledge of link status and traffic conditions can be used to optimize throughput and quality of service on the backhaul network.

The dual wireless backhaul links may be treated as a single link and treated collectively as a single logical backhaul link by network elements on the network. At the same time, the network elements interfacing the links have knowledge of the number of distinct channels forming the logical link, and hence may address each channel individually to logically separate flows on the network or to separate different types of traffic on the network. This allows the network elements to increase the quality of service provided to particular types of traffic, for example delay sensitive or jitter sensitive traffic. For example, one of the several channels on the link, e.g. channel 27A, may be reserved for high priority traffic to provide a more readily available backhaul channel for the high priority traffic while the other channel, e.g. channel 27B, may be used to carry lower priority traffic. Although two channels have been illustrated in FIG. 3, and an embodiment in which two channels is used will be discussed in greater detail herein, the invention is not limited in this regard as more than two channels may be used as well. Similarly, the invention is not limited to an embodiment in which all wireless links on the backhaul are dual or multi-redundant links.

According to an embodiment of the invention, different types of traffic may be routed to one of links such as link 27A or link 27B during normal operating conditions. For example, VoIP traffic may be routinely routed to link 27A while data traffic may be routed to link 27B. This allows data traffic to be handled differently by the BTSs and prevents data bursts from interrupting VoIP traffic. At the same time, confining knowledge of the dual link structure and logical traffic separation to the BTSs implementing the separation allows the BTSs to implement a local restoration in the event that one of the links experiences failure. Specifically, restoration may be implemented by the BTS by causing the BTS to route all traffic over the non-failing link. Optionally, the BTS may advertise a link availability of reduced size in the event of a failure to allow traffic on the network to find other paths through the network. The invention is not limited in this manner, however, as the type of advertisement and the type of routing information that will be distributed on the network will depend to a great extend on the particular routing protocol configured to be used by the BTSs on the backhaul network.

The use of redundant channels in the backhaul network also enhances backhaul capabilities by providing for higher throughput in the backhaul than otherwise is provided by the protocol used to implement the backhaul. Specifically, each of the several channels may carry traffic up to the limit defined by the protocol used to implement the channel. Thus, enhanced amounts of data may be carried on the backhaul, which increases the amount of traffic that may be carried by the cellular and other networks served by the backhaul network.

Additionally, the use of redundant channels in the backhaul enhances resiliency of the backhaul network. Specifically, a problem on one of the channels on the link such as a broken antenna will not cause the entire link to be inaccessible but rather will only cause a reduction in available bandwidth on the aggregated logical link. Thus, an antenna failure on the link may be accommodated more readily than where a single antenna forming a single channel is used to implement the link. Additionally, in a noisy environment, the two links may be used to transmit the same data to increase the reliability of the transmissions.

Failure on one of the links may be detected through the use of a pinging protocol, where each network element transmits a ping on the link every 1 millisecond or other interval, and the end systems listen for pings from the other network element. If a ping is missed, or a predetermined number of pings are not received, the network element on the other end of the link may assume that there is a problem with the link. Alternatively, status messages may be used to check the status of the link. Other methods of ensuring link availability may be used as well and the invention is not limited to use with one of these described checking/verifying mechanisms.

Figure 3:
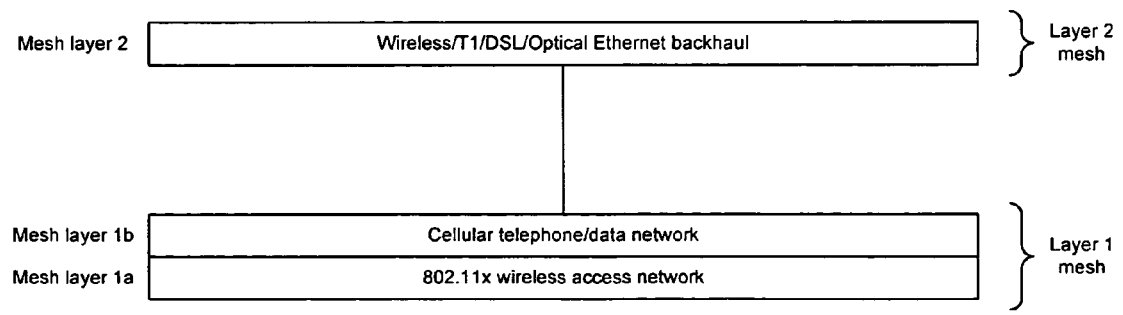
FIG. 3 is a hierarchical diagram illustrating the mesh tiers of wireless networking that may be configured to be employed in the network of FIG. 1 over the BTSs of FIG. 2.

FIG. 3 illustrates the relationship between the multiple communication technologies that may be used to provide wireless network access to user equipment. As shown in FIG. 3, a multiple tier mesh network may be formed using one or more communication protocols at each tier to enable transmissions to take place simultaneously on the multiple meshes. For example, in the embodiment illustrated in FIG. 3, the lower tier mesh network, which is configured to communicate with user equipment, may be formed of a cellular telephone or data network technology, and a parallel voice/data communication network formed e.g. out of one of the 802.11x communication protocols. The networks at this tier may be formed as fully meshed networks in which user equipment routes traffic for other user equipment, or may be formed as partially meshed networks in which access points provide meshed coverage and the user equipment are configured to talk to the access points. Optionally, this tier of mesh networking may be formed using two or more communication protocol technologies. For example, the subscriber wireless network may have a mesh of access points communicating using the IEEE 802.11a protocol, and may communicate with user equipment using the IEEE 802.11b protocol. The invention is not limited to this embodiment, however.

The network architecture also includes a backhaul network that includes wireless as well as fixed links. As discussed above, some of the wireless backhaul network links may be formed using a wireless technology with relatively high throughput, such as 802.11a or 802.16. The other technologies mentioned above may be used as well and the invention is not limited to these particular mentioned technologies. Optionally, one of the tier 1 mesh networks may serve as a backup path for the backhaul network where there is a problem with the backhaul network such as failure or congestion on the backhaul network. The backup paths over the underlying tier 1 meshed network may be formed of redundant wireless links in a manner similar to the redundant backhaul wireless links, as described in greater detail above.

Figure 4:
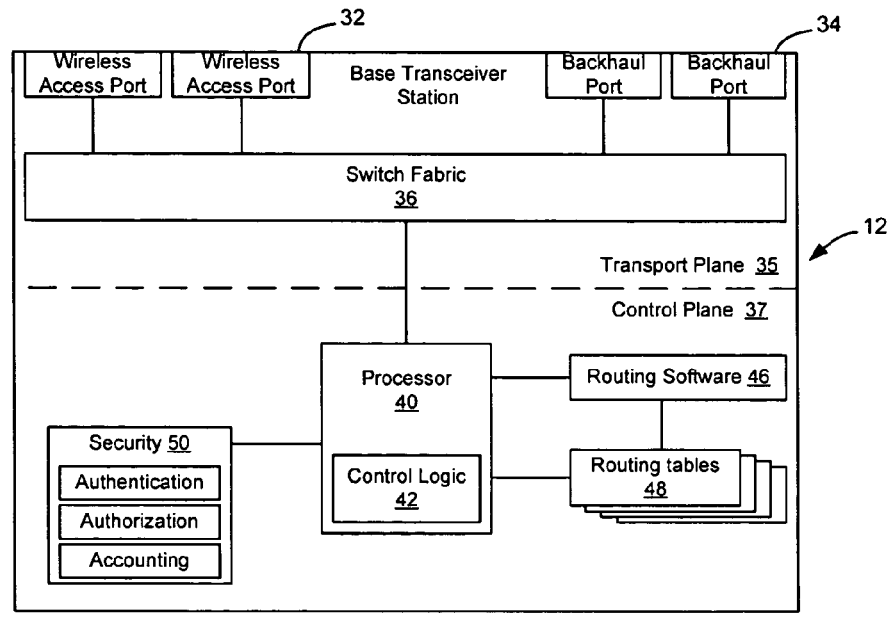
FIG. 4 is a functional block diagram of a Base Transceiver Station (BTS)

FIG. 4 illustrates one example of a base transceiver station 12 having wireless access ports 32 configured to interface one or more access antennas, and one or more backhaul ports 34, such as a T1 port, configured to output signals toward a central office. The base transceiver station may be used in the network of FIG. 1 or another wireless network. Additionally, the BTS may interface over one or more of the backhaul ports to one or more mesh backhaul interface cards described below to allow the backhaul traffic to be routed over a meshed backhaul network as described in greater detail herein.

The BTS 12 of FIG. 4 includes a transport plane 35 configured to handle traffic on the network and a control plane 37 configured to control operation of the transport plane. The transport plane includes the wireless access 32 and backhaul ports 34, and a switch fabric 36 configured to interconnect the several ports and transport data between the ports. Optionally one or more of the backhaul ports may be implement by or connected to an interface card, such as the BTS backhaul interface card discussed below in connection with FIG. 5.

The control plane includes a processor 40 containing control logic 42 configured to enable the base transceiver station to route packets between the interfaces through the implementation of appropriate instructions. One or more software or hardware modules may be included and interfaced to the processor 40. For example, the base transceiver station may include routing software 46 configured to enable the network processor to make routing decisions on the network. Routing information for use by the routing software may be stored in routing tables 48 that may be accessed in connection with routing decisions on the network. The routing information may be used to control the transport plane, for example by directing the transport plane to output protocol data units in a particular flow or of a particular type to be output over a particular port. Additionally, the routing information may be used by other aspects of the base transceiver station, such as by an antenna control unit (not shown), to enable the antennas to direct transmission of the information in the correct direction, e.g. when directional antennas are connected to the access ports. Optionally, the directionality information may form part of the interface definition and may be provided automatically to the antennas in connection with designating a particular protocol data unit to be broadcast from a particular interface.

One or more other modules, such as a security module 50, may be included in the BTS as well to perform security functions such as authentication, authorization, and accounting. Implementation of a security module enables undesirable traffic to be filtered at the BTS to reserve the available bandwidth for desired or authorized traffic. BTSs may be designed in numerous different ways, and the invention is not limited to the BTS illustrated in FIG. 5 or with any other particular BTS.

Figure 5:
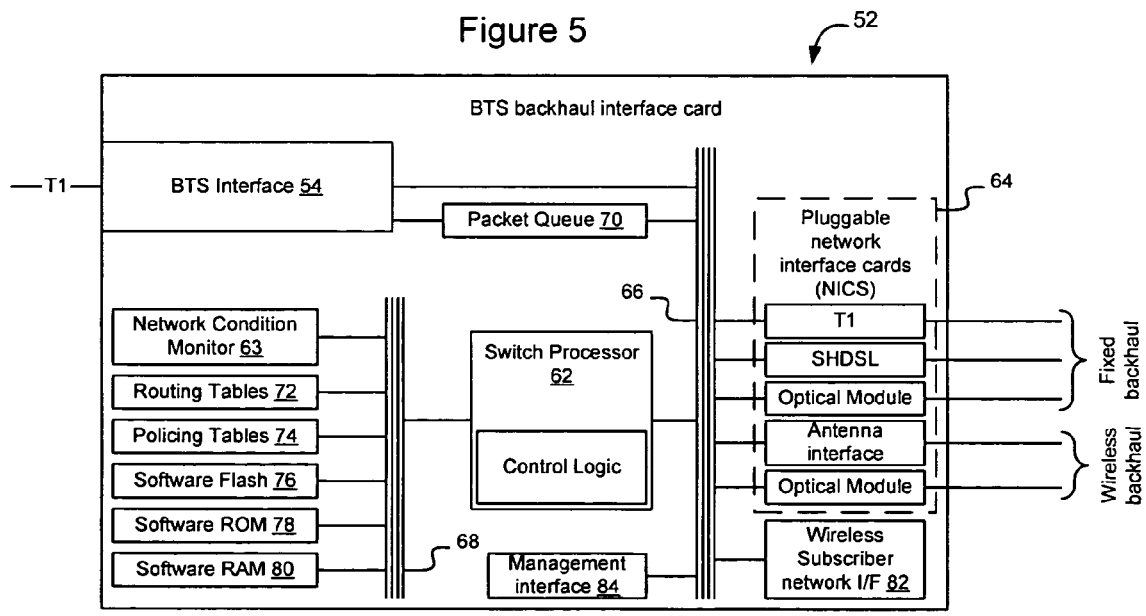
FIG. 5 is a functional block diagram of a BTS backhaul interface card according to an embodiment of the invention.

FIG. 5 illustrates an example of a Base Transceiver Station Backhaul Interface Card (BTS-BIC) 52 that is configured to be interfaced to or incorporated in BTS equipment, such as the BTS of FIG. 4, to enable the BTS to be interfaced to a meshed backhaul network. The BTS-BIC, as discussed in greater detail below, may be configured to route traffic over the redundant links forming the single logical link, independent of the control plane of the BTS. Thus, routing at the network level may take place in the control plane while link level routing may take place in the transportation plane via the BTS-BIC. Local link failure may thus be handled by the transport plane independent of the control plane.

In the embodiment illustrated in FIG. 5, one or more BTS interfaces 54 are provided to interface with the BTS 12. The BTS interfaces may be formed to comply with the T1 standard to allow the BTS-BIC to interface with a BTS having a T1 backhaul port 34. Alternatively, where the BTS-BIC is to be incorporated as a board in the BTS, the BTS interface may be a standard bus interface or otherwise configured to interface the switch fabric 36. The invention is not limited to any particular technology, as the BTS interface may be formed using any conventional standardized or proprietary technology.

Protocol data units such as packets, that are received over the BTS interface 54, are passed over a data bus to a switch processor 62 which causes the packets to be routed to be output over one or more backhaul links.

By switching between multiple available backhaul links, optionally formed using different technologies, numerous backhaul paths may be available through the BTS-BIC. For example, in the example illustrated in FIG. 5, the switch processor 62 may have a choice of outputting signals over one or more T1 backhaul links, one or more SHDHL links, one or more optical links, and over one or more wireless links, depending on the manner in which the BTS-BIC has been configured. Additionally, data arriving at the BTS-BIC may also be divided between two or more output backhaul links using one or more technologies to provide enhanced backhaul options to the base transceiver station and to enable the BTS to be interfaced to a meshed backhaul network. Routing between links terminating at the same point on the network will be performed by the switch processor 62 to allow link-based routing to take place in the BTS-BIC rather than in the control plane of the BTS. This allows the BTS-BIC to handle mesh network routing as well as redundant link selection to enable a standard BTS to be interfaced to a meshed backhaul network.

The backhaul links may be interfaced to the BTS-BIC using pluggable network interface cards (NICs) 64. These NICs may be plugged into an expansion slot on an expansion bus 66 (such as a Peripheral Control Interconnect (PCI) bus) and addressed by the switch processor accordingly. Other methods of interfacing the NICs may be used as well, and the invention is not limited to this embodiment. Including wireless backhaul, fixed backhaul, or both types of backhaul, enables the BTS backhaul interface card to be used to enable a conventional BTS to have access to meshed backhaul resources as well as to multiple types of backhaul facilities depending on the location of the BTS in the network, the available backhaul technology at that location, the state of the various available backhaul links on the network, and multiple other factors.

Optionally, one or more packet queues 70 may be connected to the bus 66 to store packets while the switch processor processes the packet and for transmission over the backhaul links. The packet queues 70, in this embodiment, may be any standard packet queue or packet storage facility. Optionally, the packets may be passed directly to the packet queue from the BTS interface 54 using direct memory access facilities (not shown) to reduce congestion on the expansion bus 68. The expansion bus may be a traditional bus or may be a switch fabric similar to switch fabric 36.

Optionally, the BTS-BIC may also include a wireless subscriber network interface 82 configured to allow the BTS to handle traffic from the wireless subscriber network. Additionally, the BTS-BIC may also include a management port 84, such as an Ethernet port (i.e. 10baseT, 100baseT, 1000baseT, 10baseF, 100baseFX), or a Universal Serial Bus (USB) port, to enable the BTS-BIC to be connected to fixed network resources or to a management terminal. The management port may be connected to expansion bus 66, or may be connected to expansion bus 68 (discussed below).

The Ethernet switch processor is also connected to an expansion bus 68, such as a PCI bus, although the invention is not limited to the use of a particular type of expansion bus. The expansion bus connects the switch processor with various resources, such as storage resources, that may be configured to store information temporarily or permanently on the BTS backhaul interface card. For example, one slot on the expansion bus may be connected to a storage area containing routing tables 72. The switch processor 62 will typically access the routing tables when ascertaining how to handle a particular protocol data unit or type of protocol data unit. The routing tables, in this embodiment, may be used to keep track of which addresses are reachable through the BTS-BIC, which link should be used for particular types of transmissions, and over which port a packet should be directed for that flow. For example, a data structure that may be used to perform routing at the link-level may include a table correlating next hop information and traffic type information with port and link information. Similarly, the link-level table may include topography information indicative of paths through the mesh to a particular destination. Where link-based routing is to be performed based in part on traffic type, including traffic type in the routing table allows the BTS-BIC to differentiate between types of traffic to cause particular types of traffic to use specific links on the network.

Another slot on the expansion bus may be occupied by a memory module containing policing tables 74, for example configured to store filter rules for implementation on the BTS-BIC to allow the BTS-BIC to remove traffic that should not be passed over the backhaul network. For example, the network operator may desire to filter traffic to prevent a portion of the received traffic from being transmitted or re-transmitted on the backhaul network. Several reasons for doing this may be to block access to a network user that has not established an account with the network operator, to block access to a network user that has an outstanding balance with the network operator, or to block access to a network user who has abused the network access privileges in some way, for example by sending an excessive amount of traffic, engaging in an attack on the network, or sending undesired/unsolicited e-mail traffic (spam). Blocking traffic may be particularly advantageous where the BTS-BIC is configured to interface a wireless subscriber network, such as an 802.11 data network, in which access controls may be more difficult to implement or less uniformly applied.

The policing tables may include a list of blocked IP addresses, MAC addresses, and/or other types of information associated with network users. Optionally, the filtering rules contained in the policing tables may be more complicated and take into account the type of traffic as well as the source, and optionally, destination, addresses. For example, a network operator may determine that a network user is generating an inordinate amount of unauthorized traffic, and may determine that the network user should not be allowed to send e-mail messages on the network. However, the network operator may still wish to provide network access to the network user to allow the network user to continue to access resources and receive e-mail over the network. The policing tables, in this example, may include a rule indicating that e-mail traffic generated by a particular P address or MAC address should not be forwarded over the backhaul network for that user.

In addition to rules pertaining to individual users, the policing tables may be configured to include general policy rules, such as a rule that an emergency message such as a "911" message will always be forwarded regardless of whether the network user generating the emergency message does not have an account or is otherwise blocked from issuing traffic on the network. Other policy rules and filter rules may be implemented in the policing tables and the invention is not limited to any particular policing rules.

Several additional memory modules may also be connected to the expansion bus. For example, a flash memory 76 may be attached to a slot on the expansion bus and configured to hold software and state information to be used by the switch processor in connection with boot operations of the BTS or BTS-BIC. For example, the flash memory may be configured to hold default instructions as well as state information associated with programs, communication sessions, and network users, that may have been using the resources provided by the BTS backhaul interface card prior to the event which caused the required reboot process. The flash memory may also contain initial instructions pertaining to operations the BTS backhaul interface card should take in connection with any instantiated handshake protocols on the network. The invention is not limited to any particular type of information stored in the flash memory.

A Read Only Memory (ROM) 78 and a Random Access Memory (RAM) 80 may also be provided to store information, such as data and instructions, for execution on the switch processor. The RAM and ROM may be formed using any standard memory technology and the invention is not limited to any particular type of memory technology. The RAM and ROM may be used to store state information associated with flows through the network, software to be utilized by the switch processor in connection with processing protocol data units received over the various communication links and any other convenient data or instructions. Other memory modules may be connected to the expansion bus 100, such as a log module or removable memory resource, and the invention is not limited to a network device containing only the illustrated resources.

Figure 6:
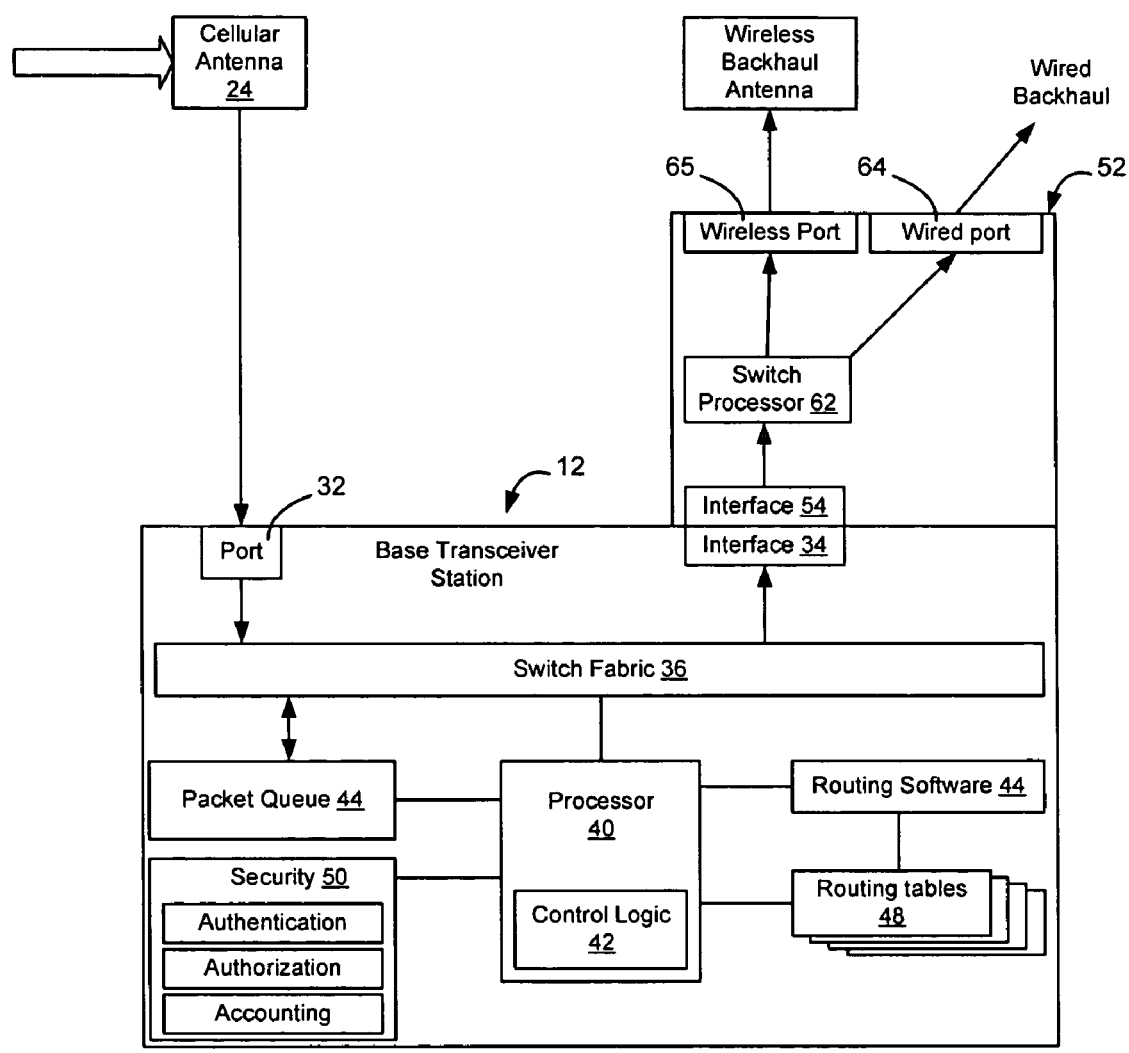
FIG. 6 is a functional block diagram of a network element formed of a BTS of FIG. 5 interfaced with a BTS backhaul interface card of FIG. 6 and illustrating the flow of an incoming packet of data through the network element.

FIG. 6 illustrates an embodiment of the invention in which a BTS backhaul interface card, such as the BTS-BIC of FIG. 5, is interfaced to a BTS network element, such as the BTS of FIG. 4. FIG. 6 also shows the path a packet will take once received at the BTS according to an embodiment of the invention. The invention is not limited to the embodiment illustrated in FIG. 6, as other types of BTSs and BTS-BICs may be used as well. As shown in FIG. 6, cellular signals are received on a cellular antenna 24 and transmitted down the tower 20 to the base transceiver station 12. They arrive at a cellular interface (port) 32 and are processed in standard fashion by the BTS. For example, the packets may be stored in a packet queue 44 pending a routing decision by the BTS processor 40, and then routed across the switch fabric 36 to the appropriate backhaul interface 34.

Signals output over BTS-BIC interface 34 are received by the BTS interface 54 on the BTS-BIC 52. The BTS-BIC 52 may be co-located with the BTS 12 at the bottom of the tower and share a power supply with the BTS or, alternatively, may be located elsewhere, with its own-power supply. For example, the BTS-BIC may be located at the top of the tower with the radio antenna units configured to provide wireless backhaul capabilities on the cellular network. The invention is not limited to the location of the BTS-BIC relative to the BTS.

Signals received over the BTS interface 54 on the BTS-BIC are sent to the network processor 62 where a routing decision is made as to how the packets should be directed. If they are to proceed via the wireless backhaul, they are sent to one of the wireless network interface cards 64 and are broadcast or directionally transmitted over one or more wireless backhaul antennae 26. If the packets are to be sent out over the wired backhaul network, they are sent to one of the wired network interface cards 64 and then out onto the wired backhaul network. In this manner routing required by the mesh network topography in the backhaul may be provided to a conventional BTS to allow the BTS to be connected to the mesh backhaul network. Additionally, signals received by the cellular BTS may be output to the backhaul network without requiring the BTS to be retrofitted to handle the new backhaul network technologies. Where redundant links are used in the backhaul network, the switch processor will select an appropriate link for the traffic.

The BTS backhaul interface card may also enable signals to be received over the wireless and fixed network interfaces. There are several instances where this may occur. The first is in connection with a bi-directional communication occurring on the cellular network. For example, voice transmissions typically involve two or more parties engaging in conversation, which requires traffic to be passed from the cellular network to the backhaul network, and from the backhaul network to the cellular network. Packets received over the backhaul network will traverse the reverse path to be broadcast over the cellular network. Since the packets are formatted to take on a format expected by the BTS before being output on the BTS port 54, the BTS is not aware that the signals were transported from the CO to the BTS using an alternative backhaul technology or a meshed backhaul infrastructure.

Another instance where the BTS-BIC may receive wireless signals is where the BTS-BIC may be required to forward backhaul traffic received from another BTS toward the central office. For example, in an embodiment where the backhaul network is formed in a mesh topology, backhaul traffic from one BTS can be expected to be passed to one or more adjacent BTSs before reaching the central office or other aggregating point. In this instance, the switch, under the direction of the forwarding information base, will direct the received backhaul signals to be forwarded toward the central office.

A third way in which wireless signals may be received by the BTS-BIC is where the BTS-BIC is configured to also interface a wireless subscriber network that handles transmissions on behalf of user equipment, e.g. a wireless network in addition to or instead of the cellular network. One embodiment in which this may occur is described above in connection with an IEEE 802.11x wireless network. In this situation, the BTS-BIC will receive the data from the wireless subscriber network and treat it as if it had been received over the BTS interface. Specifically, the protocol data units will be received and directed to the switch processor 62, which will make a routing decision as to where the protocol data units should be output. Where the flow is required to be output over the backhaul, the BTS-BIC will forward the traffic onto the backhaul (either wireless or wired). Where the flow is required to be sent to a cellular customer, the traffic from the flow may be directed to the BTS interface.

The BTS-BIC may route traffic over the redundant links using a conventional or proprietary protocol. For example, the BTS-BIC may be configured to route the packet onto whichever RF path link queue is shorter, may route packets based on size to put all short packets onto a particular path, or may put particular types of traffic onto different paths. Optionally, the traffic may be split up on the links depending on whether the traffic is voice traffic or other types of streaming media traffic, and hence sensitive to transmission delay variations, or data traffic which tends to be less sensitive to such delay variations. The invention is not limited to this one particular example, however, as numerous divisions may be implemented. When one of the links fails, the local router can respond instantly yielding less than the required 50 ms link restoration time by shifting all traffic to the non-failing link. The reduction in bandwidth on the link may then be provided to the control plane of the BTS to enable re-optimization to occur in the network as a whole. Since the BTS-BIC, according to one embodiment of the invention, has limited knowledge of the mesh topography, the BTS may supply routing information to the BTS-BIC as the network topography changes.

Where the BTS-BIC is connected to one or more antennas, the antennas may be connected to the BTS-BIC via one or more optical fibers or electrical connections. The cable/fiber bundle used to provide power and data signals to the antenna may be grounded and/or isolated using an isolator, such as a telecom primary protector to prevent lightening strikes from affecting the BTS backhaul interface card. The cable may also be used to power the antennas using a protocol such as power over Ethernet, although the invention is not limited in this manner.

Optionally, as shown in FIG. 3, signals to be output from the antennas may be transmitted up the tower using an antenna associated with the base transceiver station 31, received by a downward looking antenna 30 located up the tower, and re-broadcast from one or more antennas 22 on the tower. Isolating the BTS equipment from the tower enables the BTS equipment to be moved into an enclosed area, such as an environmentally controlled area, to reduce the effect of weather on the equipment and allows the BTS-BIC and BTS to be isolated from potential lightening strikes.

Figure 7:
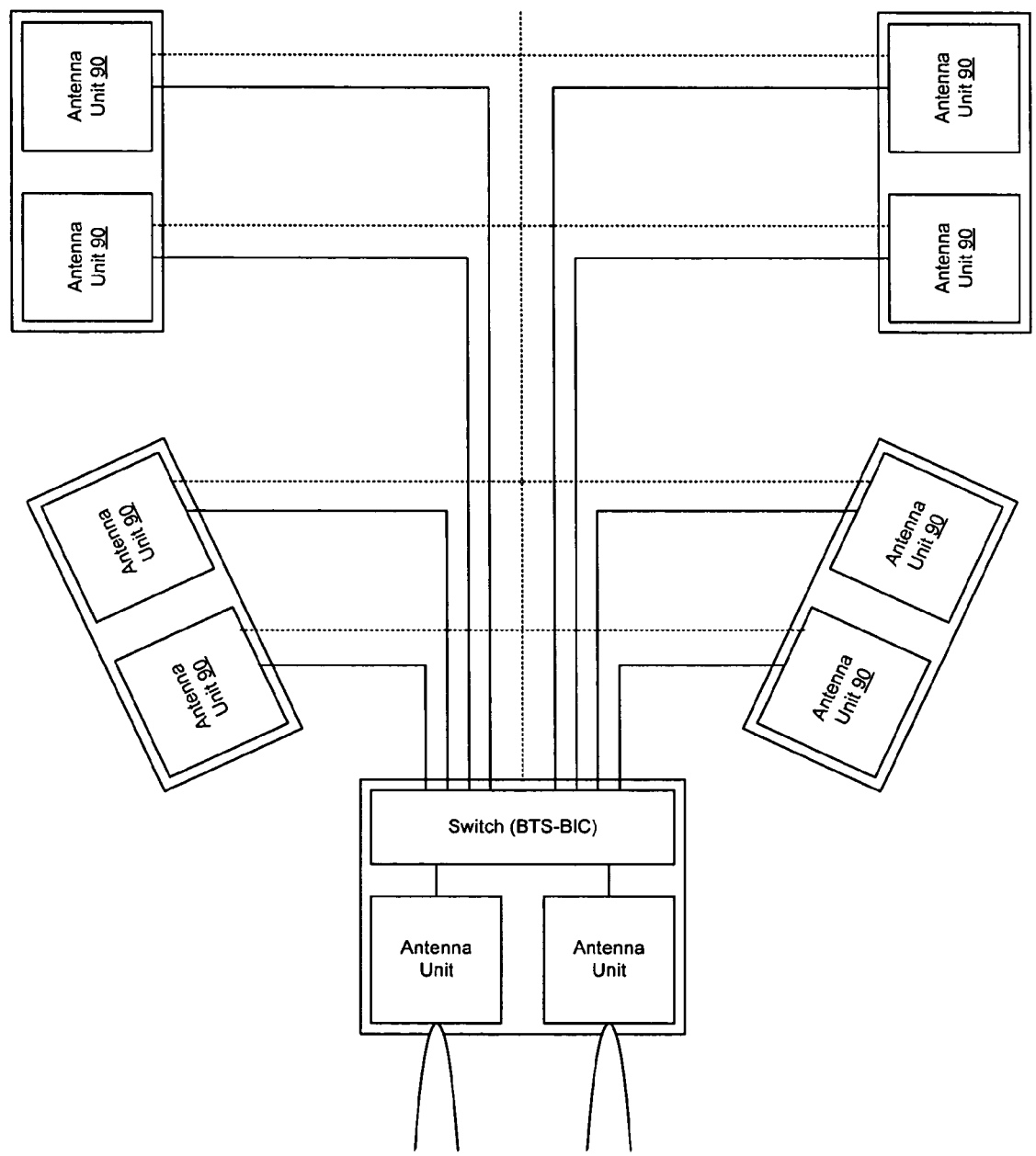
FIG. 7 is a functional block diagram of an addressable antenna network according to an embodiment of the invention.

According to an embodiment of the invention, a network of radio antenna units 90 (an example of which is illustrated in FIG. 7) may be formed and interconnected on top of a cellular tower and connected to at least one radio accessed router 92. The radio accessed router may incorporate a BTS-BIC, an example of which has been described above, to provide shared access to multiple communication networks and to allow the communication networks to share a common BTS. In the embodiment illustrated in FIG. 7, the solid lines connecting the switch and the radio antenna units are the data lines and the dashed lines are the power lines. Where PoE is used to provide power from the radio accessed router to the radio antenna units, the separate power connection may be eliminated.

In the embodiment illustrated in FIG. 7, radio access is provided to a radio accessed router on the tower to provide vertical backhaul access to radio antenna units on the tower without running optical fibers or electrical wires up the tower. Eliminating the need for a physical interconnection facilitates deployment and enables electrical isolation between the antenna and BTS to minimize the likelihood that an electrical surge, such as might be caused by a lightening strike, will affect the BTS or other ground equipment. Optionally, as discussed in greater detail below, power may be supplied to the network of radio antenna units from an array of solar panels to further isolate the network of radio antenna units and the radio accessed router from other electrical equipment.

As shown in FIG. 7, the radio accessed router has redundant ground facing antennas (integrated or attached) to enable a multiple channel uplink to be formed between the BTS and the remote network of radio antenna units. The antennas may be configured to transmit data using point to point wireless optical or one of the wireless technologies discussed herein for use in the backhaul network.

The radio accessed router also includes router circuitry, optionally provided by the BTS-BIC described above, to enable data received over the uplink to be directed to one or more of the connected radio antenna units. In the illustrated example, each antenna is individually addressable, e.g. with a unique IP address, to allow data received over the uplink to be transferred to the particular radio antenna unit. The invention is not limited to the particular arrangement illustrated in FIG. 7 as many different network topographies may be developed to be deployed in the network of FIG. 7.

Although a wireless uplink has been described herein, the invention is not limited to an embodiment in which a wireless uplink is used, as other forms of interconnections may be used as well. For example, the interconnection between the BTS and radio accessed router may be formed using an electrical or optical connection. Where the uplink is a wired connection, the radio accessed router may perform the same functions except that it receives the data from the BTS through a different connection.

Where the communication between the BTS and the radio accessed router take place over a wireless link, security may be implemented on the link, for example through the use of appropriate encryption and decryption processes. The encryption and decryption may be performed using hardware encryption accelerators or in another manner and the invention is not limited to the manner in which these processes are implemented.

Figure 8:
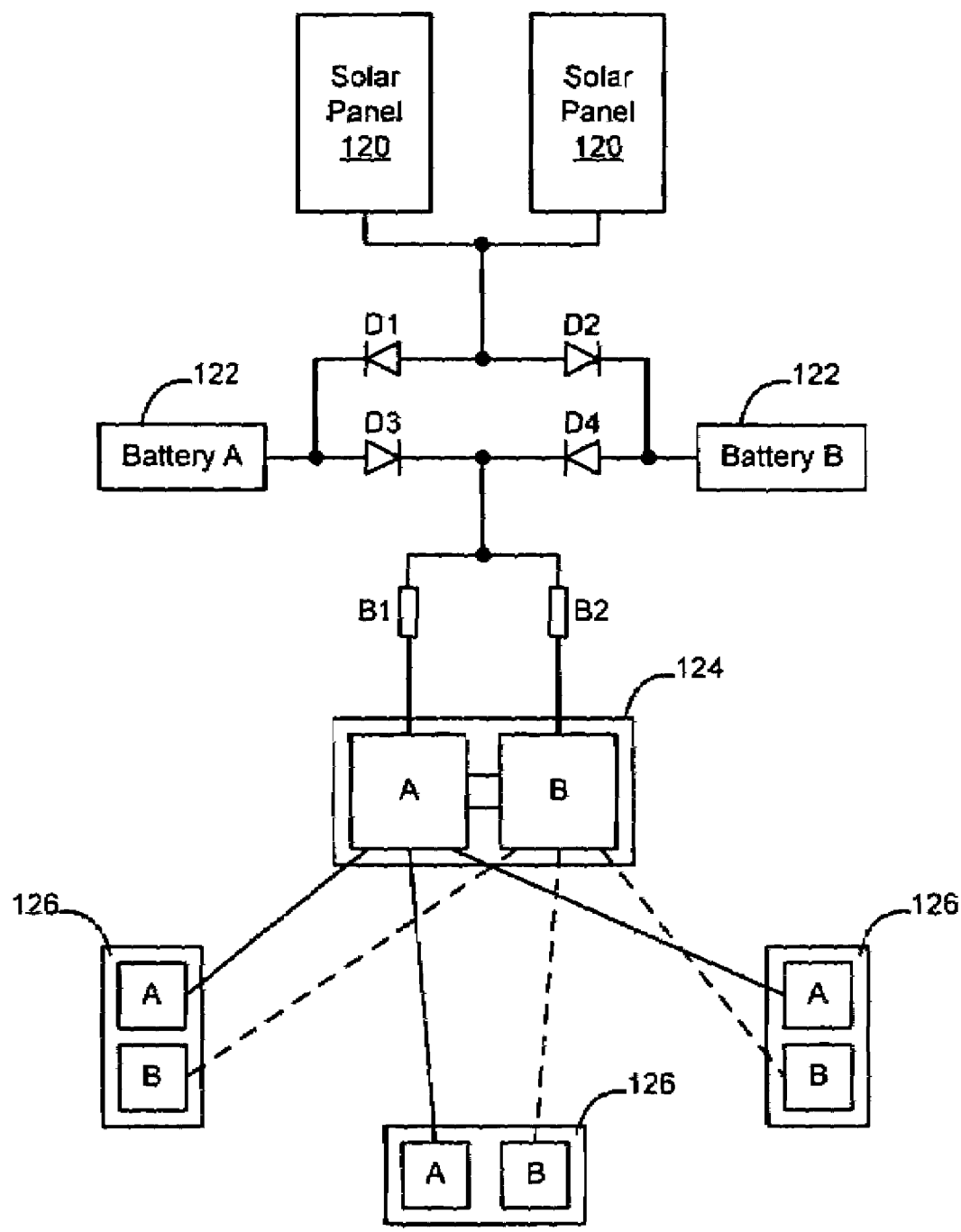
FIG. 8 is a functional block diagram of a self-powered addressable antenna network according to an embodiment of the invention.

FIG. 8 illustrates a wiring diagram of an embodiment in which solar panels are configured to provide power to dual redundant radio accessed routers and an associated network of radio antenna units. As shown in FIG. 8, one or more solar panels 120 may generate electricity to charge one or more batteries 122. Power from the batteries is then used to power the radio accessed routers 124 and network of radio antenna units 126. In the illustrated embodiment, the radio antenna units obtain power from the radio accessed router. The invention is not limited in this manner, however, as they may obtain power directly from the battery as well. Where the solar powered batteries are located close to the antenna modules and router, lightening protection can be reduced since the whole unit will float during a lightening surge.

Series connected diodes interconnect the solar panels to the batteries. Specifically, in the illustrated embodiment, a first diode D1 is interposed between the solar panel(s) 120 and battery A, and a second diode D2 is interposed between the solar panel(s) 120 and battery B. The diodes prevent power from being drained from the batteries toward the solar panels.

Although the illustrated embodiment implements power isolation with diodes, the invention is not limited in this manner as other circuits may be used as well. For example, where differentially sized batteries are used, i.e. where battery A is larger than battery B, it may be desirable to cause battery A to receive more charge than battery B. This may be accomplished with an appropriate arrangement of voltage sensors, resistors, and field effect transistors.

A second set of diodes (diodes D3 and D4) connect the batteries to the radio accessed router and network of radio antenna units. Optionally breakers B1 and B2 may be provided to isolate the radio power supply from the active electronics forming the radio accessed router and/or radio antenna units. Although isolation of the components has been accomplished using diodes in FIG. 8, the invention is not limited in this manner as other methods of isolating the components may be used as well. For example, transistors may be used to switch the lines on and off depending on the voltage levels available in the batteries, etc. Additionally, only the positive polarity wirings have been illustrated in FIG. 8. Similar connections would be made for the negative polarity connections.

In the embodiment illustrated in FIG. 8, when battery A is replaced, battery B provides power. If battery A or B fails, the remaining battery takes over, due to the diode circuit. In this embodiment, the failed battery fails in the open circuit condition. The remaining battery will be sufficient to provide power. The batteries may be of different sizes or the same size. The batteries may be lead-acid batteries, absorption glass mat batteries, or other types of batteries. Optionally, commercially available battery monitoring devices may be included to measure battery voltage and charging current over time and to disconnect the battery from the circuit in the event of battery cell failure, open or short circuit failures, or failure to hold a charge.

The solar panels may be any form of commercially available solar cell, or alternatively may be replaced by other energy sources such as fuel cells or wind powered generators. The invention is not limited to use with solar panels Solar panels, like other electronic components, may occasionally fail and need to be replaced. To allow an alarm to be generated, the current output from each panel may be measured and the outputs compared to determine if each panel is operating in a manner similar to the other. Dissimilar operation may indicate misalignment of the panel or that the panel is failing. For example, if the current generated by one of one panel is above 30% of the maximum expected current, and the current by the other of the panels is below 10% of the maximum expected current, an alarm may be generated. The invention is not limited to use with these particular example numbers.

Figure 9:
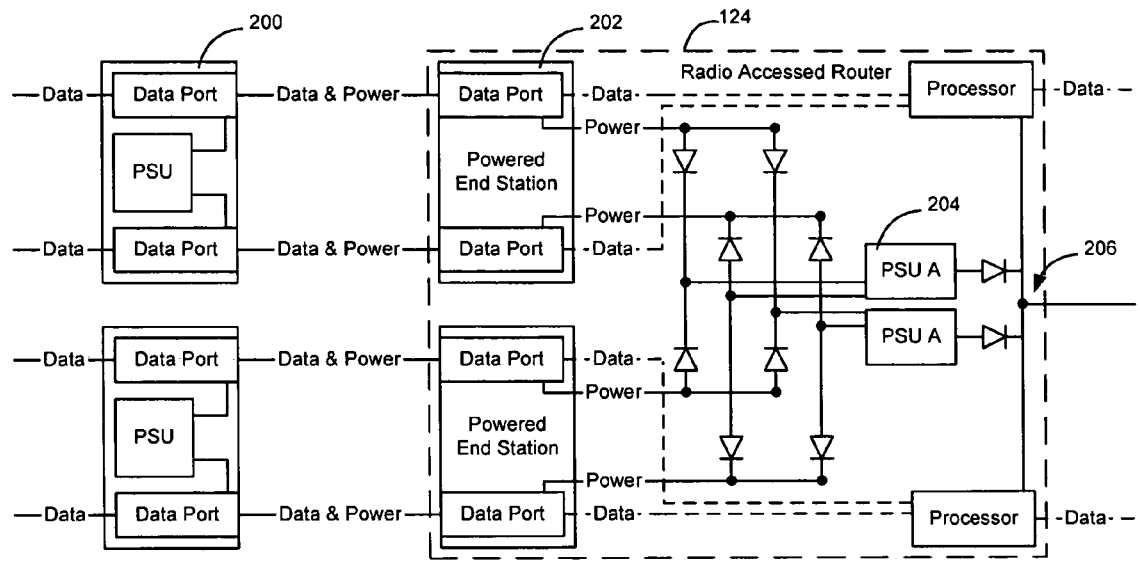
FIG. 9 is a function block diagram of an addressable antenna network powered via Power over Ethernet according to an embodiment of the invention.
Figure 10:
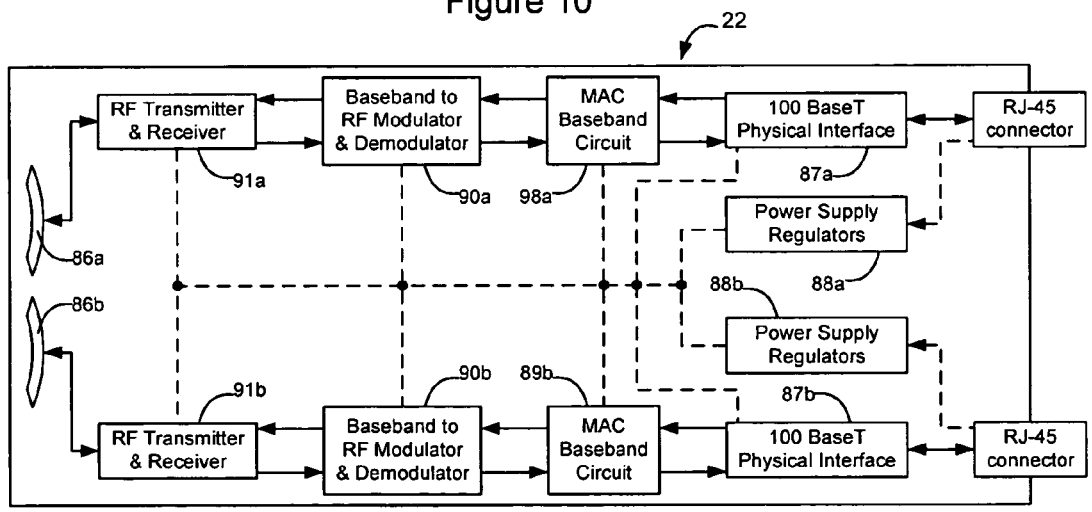
FIG. 10 is a functional block diagram of a radio antenna unit configured to transmit wireless backhaul signals on dual redundant parallel links according to an embodiment of the invention.

FIG. 9 illustrates a power supply circuit diagram in which power over Ethernet is used to provide power to the radio accessed router and radio antenna units. As shown in FIG. 10, power from power supply units on the ground is transmitted over separate twisted pair cables to the radio accessed router on the tower. The circuit in the radio accessed router allows power to be supplied to either radio accessed router individually and allows power to be supplied to both radio accessed routers from one twisted pair in the event that one of the twisted pairs is broken.

Specifically, as shown in FIG. 9, power from a power supply unit is sourced over a data port 200 connected to a twisted pair cable. Power sourcing equipment is commercially available and may be, for example, configured to operate using Power over Ethernet. The power over Ethernet standard currently provides for 48 volts of power at low current to be delivered over Ethernet cabling between appropriately configured data ports.

On the radio accessed router, powered end stations 202 extract the power from the combined data and power signals, and pass the extracted power to dual parallel power supply units 204. Optionally, diodes may be provided to ensure the power flows in the proper direction. Power from the power supply units on the radio accessed router is combined at junction 206 and may be used to power either or both of the processors.

Numerous types of radio antenna units may be used to implement the wireless backhaul links and wireless uplinks, and the invention is not limited to any particular type of radio antenna unit. To enable multiple wireless co-directional wireless links to be deployed, radio antenna units having multiple antennae, such as the unit illustrated in FIG. 10, may be used. The antennae within the radio antenna unit may be addressed individually, e.g. via the radio accessed router or from BTS-BIC, and used to transmit independent signals on the wireless network. The antennas from a given radio antenna unit are all directionally similar, however, and may be collectively aligned and used to form a single link with multiple channels in the wireless meshed backhaul network.

The antennae may be configured to transmit in one of the cellular frequencies, a wireless LAN frequency, or another frequency band. Optionally, the wireless transmissions may be configured to implement Ethernet over radio, a protocol configured to transmit Ethernet frames over a wireless interface.

According to one embodiment of the invention, the radio antenna unit includes two parallel active circuits, each of which is configured to drive a dish or patch array antenna 86a, 86b (e.g. a 4×4 patch array antenna). For example, as shown in FIG. 10, baseband signals, such as Ethernet signals, received over an RJ-45 connector or other commercially available connector are passed to a 100 BaseT or other Ethernet physical interface (PHY) 87a, 87b. Where power for the radio antenna unit is to be provided using Power over Ethernet, the power will be taken from the signals and supplied to the power supply regulators 88a, 88b in a manner similar to that discussed above in connection with FIG. 9. Other ways of powering the radio antenna units may be used as well.

The Ethernet signals are passed to a MAC baseband circuit 89a, 89b, and then converted to RF signals in a baseband RF modulator/demodulator 90a, 90b. The RF signals are passed to an RF transmitter/receiver 91a, 91b, which causes the signals to be transmitted over the antennae 86a, 86b. The link between the RF transmitter/receiver and the antennae may be formed using a shielded cable with the shield tied to ground potential, or may be formed using another conventional connection.

The radio antenna unit 22 may be independently grounded using a safety ground or may be grounded along with other radio antenna units on the tower. Electrical power may be provided to the radio antenna units through a shared electrical feed and may connect to the shared electrical feed using one or more power taps. To enable the antennas within the radio antenna unit 22 to remain independent, each antenna is provided with a power supply unit, optionally including a transformer, to provide power to the antenna. The power feed may supply a DC voltage or an AC voltage. Where an AC voltage is supplied, a relatively low voltage is preferably supplied, such as 30 Volt RMS, with a frequency of between 50 Hz to several MHz. Other voltages and frequencies may be used as well and the invention is not limited to these described ranges. Optionally, the radio antenna units may be powered using power over Ethernet using a power circuit similar to the one described above in connection with FIG. 9.

Since the radio antenna unit in one embodiment of the invention is to be used as a directional wireless backhaul antenna, initial optical alignment of the antenna may be accomplished in a number of ways. According to one embodiment of the invention, a channel is included in the casing of the radio antenna unit through which a technician may look to perform an initial optical alignment of the radio antenna unit. According to another embodiment of the invention, a channel or protuberance may be formed on the casing of the antenna with which a scope may be mounted to enable the technician to optically sight the radio antenna unit toward another radio antenna unit to thereby enable initial directionality to be established for the radio antenna unit.

FIGS. 11A-11B, 12A-12C, and 13A-13C illustrate several embodiments of an antenna casing 94 in which an optical sight mechanism is provided to enable initial optical alignment of the antenna during the mounting process or when alignment is altered during operation. The invention is not limited to the several embodiments illustrated in these Figs. as other designs may be used as well.

In FIGS. 11A-11B, the optical sight is formed as an aperture 96 in the casing 94 passing from a first surface 98 to a second surface 100. The particular location of the aperture on the casing is less important than the direction in which the aperture points. Specifically, according to an embodiment of the invention, the aperture is directed such that an axis of the aperture is parallel with a directional beam formed by one of the antennas 86a, 86b. Thus, an installer may look through the aperture to identify the direction in which the beam will be transmitted from the antenna. This, then, may be used to align the antenna for transmission. Optionally, a lens may be formed on one or both ends of the aperture to enhance optical characteristics of the aperture, e.g. to magnify the image viewed through the aperture. Additionally, the lenses may seal the aperture to prevent moisture and debris from building up within the aperture. The invention is not limited in this manner, however.

FIGS. 12A-12C illustrate another embodiment in which an aperture 102 is formed in the casing through which or along which an operator may perform an initial visual orientation. The aperture is provided with a connecting slot 104 connecting the aperture with an adjacent edge 106. The slot 104 enables moisture to drip out of the aperture 102 to thereby minimize the likelihood that the moisture will cause the casing 92 to crack if the moisture within the aperture should freeze. The slot also allows an operator to mount a sight 108 configured with a mating guide 110, as shown in FIG. 12C, to enable enhanced optical resolution of the target.

FIGS. 13A-13C illustrate a third embodiment in which an elongate protuberance 112 is formed on the casing 94 along which an operator may perform an initial visualization orientation of the antenna. A pair of protuberances or a series of protuberances may be used as well without departing from the scope of the invention. The protuberance(s) 112 may also be used to mount a sight 114, as shown in FIG. 13C, to enable enhanced optical resolution of the target. Using one or more protuberances reduces the chance that water collecting in an aperture may freeze and cause the casing to crack.

If the antennas are implemented as patch array antennas having an approximate 10 degree beam, an optical sight should be able to provide an initial alignment to enable the now aligned antenna to transmit signals to be received on another antenna. Optionally feedback, e.g. from a beacon signal, in the form of signal strength or other indicia, may be used to fine-tune the alignment of the antenna upon completion of the initial optical alignment or in connection with the initial optical alignment.

Control logic in the several processors described herein may be implemented as one or more sets of program instructions that are stored in a computer readable memory within the network element and executed on a microprocessor within the network element. However, it will be apparent to a skilled artisan that all logic described herein can be embodied using discrete components, integrated circuitry, programmable logic used in conjunction with a programmable logic device such as a Field Programmable Gate Array (FPGA) or microprocessor, or any other device including any combination thereof. Programmable logic can be fixed temporarily or permanently in a tangible medium such as a read-only memory chip, a computer memory, a disk, or other storage medium. Programmable logic can also be fixed in a computer data signal embodied in a carrier wave, allowing the programmable logic to be transmitted over an interface such as a computer bus or communication network. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A communication network, comprising:
 a wireless network formed from a plurality of base transceiver stations configured to operate according to a wireless network technology; and
 a meshed backhaul network configured to carry backhaul traffic for said cellular network from the base transceiver stations to an aggregation point, said meshed backhaul network comprising links between the base transceiver stations and between the base transceiver stations and the aggregation point;
 wherein at least one of the links is a dual redundant wireless link interconnecting two network elements, said two network elements comprising two of the base transceiver stations or a base transceiver station and an aggregation point;
 wherein the dual redundant wireless link includes at least two individual wireless links, and wherein knowledge of the at least two wireless links is limited to the two network elements interconnected by the at least two wireless links; and
 wherein the network elements are configured to advertise an aggregate bandwidth available on the at least two wireless links as a single available bandwidth to the base transceiver stations on the network.

2. The communication network of claim 1, wherein the communication network is configured to handle at least two types of network traffic, and wherein the network elements are configured to use a first of the at least two wireless links to transport a first of the types of network traffic and are configured to use another of the wireless links to transport at least a second of the types of network traffic.

3. The communication network of claim 1, wherein the meshed backhaul network comprises a plurality of dual or multiple redundant wireless links interconnecting sets of base transceiver stations.

4. The communication network of claim 1, wherein the aggregation point is a central office, and wherein the meshed backhaul network comprises a plurality of dual or multiple redundant wireless links interconnecting base transceiver stations with the central office.

5. The communication network of claim 4, further comprising a wireless backhaul aggregation point configured to interface with at least one of the base transceiver stations and forming part of the backhaul network, but which is not configured to interface with subscribers of the cellular network.

6. The communication network of claim 1, wherein the wireless network includes a wireless subscriber cellular network and a wireless subscriber data network separate from the wireless subscriber cellular network and formed from a plurality of wireless subscriber network transceivers configured to operate according to a wireless networking technology other than a cellular wireless networking technology; and wherein the backhaul network is further configured to carry traffic from the plurality of wireless subscriber network transceivers.

* * * * *